US009213486B2

(12) United States Patent
Galbraith et al.

(10) Patent No.: US 9,213,486 B2
(45) Date of Patent: Dec. 15, 2015

(54) WRITING NEW DATA OF A FIRST BLOCK SIZE TO A SECOND BLOCK SIZE USING A WRITE-WRITE MODE

(75) Inventors: Robert E. Galbraith, Rochester, MN (US); Daniel F. Moertl, Rochester, MN (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 226 days.

(21) Appl. No.: 13/402,465

(22) Filed: Feb. 22, 2012

(65) Prior Publication Data

US 2013/0219119 A1    Aug. 22, 2013

(51) Int. Cl.
*G06F 12/00* (2006.01)
*G06F 12/16* (2006.01)
*G06F 3/06* (2006.01)
*G06F 11/10* (2006.01)

(52) U.S. Cl.
CPC .............. *G06F 3/061* (2013.01); *G06F 3/0656* (2013.01); *G06F 3/0689* (2013.01); *G06F 11/1076* (2013.01); *G06F 2211/1057* (2013.01)

(58) Field of Classification Search
CPC ........................... G06F 3/0689; G06F 11/1076
See application file for complete search history.

(56) References Cited

U.S. PATENT DOCUMENTS

| | | | |
|---|---|---|---|
| 6,925,526 | B2 | 8/2005 | Hall |
| 7,080,200 | B2 * | 7/2006 | Hassner et al. ............... 711/114 |
| 7,827,150 | B1 | 11/2010 | Wu et al. |
| 7,941,600 | B2 | 5/2011 | Yagisawa et al. |
| 2005/0228842 | A1 * | 10/2005 | Pan et al. ....................... 708/422 |
| 2006/0123268 | A1 * | 6/2006 | Forhan et al. ...................... 714/6 |
| 2006/0123270 | A1 * | 6/2006 | Forhan et al. ...................... 714/6 |
| 2006/0123271 | A1 * | 6/2006 | Forhan et al. ...................... 714/7 |
| 2008/0109602 | A1 | 5/2008 | Ananthamurthy et al. |
| 2009/0138672 | A1 * | 5/2009 | Katsuragi et al. ............. 711/171 |
| 2011/0179238 | A1 | 7/2011 | Hosoya et al. |

FOREIGN PATENT DOCUMENTS

| | | |
|---|---|---|
| JP | 08030402 A | 2/1996 |
| JP | 2001282697 A | 10/2001 |

OTHER PUBLICATIONS

International Search Report and Written Opinion of the ISA dated Jul. 4, 2013—International Application No. PCT/IB2013/050752.
U.S. Appl. No. 13/113,546, filed May 23, 2011, Benhase et al., Writing of New Data of a First Block Size in a Raid Array that Stores Both Parity and Data in a Second Block Size.

* cited by examiner

*Primary Examiner* — Charles Rones
*Assistant Examiner* — Tian-Pong Chang
(74) *Attorney, Agent, or Firm* — Toler Law Group, P.C.

(57) ABSTRACT

Apparatuses and methods to write new data of a first block size are provided. A particular method may include writing old data from a destination block of a second block size of a data drive to a first buffer of the second block size. The old data may be written according to address information of the old data and without overwriting the new data in the first buffer. The method may further include writing zeros to a second buffer of the second block size according to the address information of the old data. The zeros written in the second buffer may correspond with the old data written in the first buffer.

16 Claims, 6 Drawing Sheets

WRITING NEW DATA OF A FIRST BLOCK SIZE TO A SECOND BLOCK SIZE USING A WRITE-WRITE MODE

I. FIELD OF THE DISCLOSURE

The disclosure relates to computing technologies, and more particularly, to writing data to memory.

II. BACKGROUND

A sector is a specifically sized division of a disk drive. A block is a group of sectors that can be accessed (e.g., read, written, or both) by an operating system of a host computer. Common disk drives hold 512 bytes or 528 bytes of data in a sector. Certain new disk drives hold 4,096 bytes or 4,224 bytes of data in a sector, generally referred to as 4 kilobytes (4 KB). An operating system of a host computer can build a request with a block size based on the smaller sector size even when the disk drive has a 4 KB sector size. When this block size is not a multiple of the disk drive's sector size, then a storage controller will need to read the disk drive before writing that data.

Count-key-data (CKD) is a disk data organization model of certain operating systems. CKD architecture derives its name from the record format that typically includes a field containing the number of bytes of data and a record address, an optional key field, and the data, itself. CKD records are typically stored in a block size of 512 bytes or multiples of 512 bytes. Thus, operating systems often seek to access records in less than the conventional 4 KB block size.

RAID controllers running RAID-5 or RAID-6 read the old disk drive before writing the new data to the disk drive so it can generate P parity and Q parity. Thus, when the write operation block size is not a multiple of the disk drive sector size, the storage controller does not need to issue extra disk drive operations, but it may need an efficient data flow.

III. SUMMARY OF THE DISCLOSURE

In a particular embodiment, a method to write new data of a first block size includes writing old data from a destination block of a second block size of a data drive to a first buffer of the second block size. The old data may be written according to address information of the old data and the first block may include the new data. The method may further include writing zeros to a second buffer of the second block size according to the address information of the old data. The zeros written in the second buffer may correspond with the old data written in the first buffer.

In another embodiment, an apparatus is disclosed that includes a memory and a processor configured to execute a first process that accesses the memory. The processor may be further configured to write new data of a first block size by writing old data from a destination block of a second block size of a data drive to a first buffer of the second block size. The old data may be written according to address information of the old data and the first block may include the new data. The method may further include writing zeros to a second buffer of the second block size according to the address information of the old data. The zeros written in the second buffer may correspond with the old data written in the first buffer.

In another embodiment, an apparatus is disclosed that includes a SAS controller, a memory controller, a memory, and a processor that is configured to execute a first process that accesses the memory. The processor may be further configured to write new data of a first block size by manipulating the memory controller to receive an indication that a Write-Write mode for writing the new data is selected. The processor may be further configured to manipulate the memory controller to write old data from a destination block of a second block size of a data drive to a first buffer of the second block size. The old data may be written according to address information of the old data and the first block may include the new data. The processor may be further configured to manipulate the memory controller to write zeros to a second buffer of the second block size according to the address information of the old data. The zeros written in the second buffer may correspond with the old data written in the first buffer.

Features that characterize embodiments are set forth in the claims annexed hereto and forming a further part hereof. However, for a better understanding of embodiments, and of the advantages and objectives attained through their use, reference should be made to the Drawings and to the accompanying descriptive matter.

V. DETAILED DESCRIPTION

A variety of read operations, write operations, exclusive or (XOR) operations, finite field multiplication (FFM) operations, and combinations thereof are typically performed by a storage controller to write data to disk drives. A RAID, or Redundant Array of Independent Disks, is a category of disk drives that combine two or more disk drives for the redundant storage of data in case of a failure. In certain configurations of RAID, such as RAID-5 or RAID-6, parity information may also be stored in the disk drives to facilitate recovery after a failure.

A sequence of operations has been utilized to write one block size (e.g., 512 bytes) from the host interface to another block size (e.g., 4 KB) on the disk drive interface and generate the parity information for recovery. For example, memory control logic may issue a read to a first buffer that contains new data (i.e., Read), XORs the first buffer with old data from a data drive (i.e., modify), and writes the XOR product to a second buffer (i.e., write). This sequence of three operations is referred to herein as atomic read-modify-write operations that XOR-on-the-fly (or simply XOR-on-the-fly), and the sequence is utilized with additional operations (e.g., before and after the atomic read-modify-write operations that XOR-on-the-fly) that are simply referred to herein as associated operations. The term atomic indicates that the first and second buffers cannot be accessed by others during the read-modify-write operations.

Provided herein are embodiments of apparatuses and methods of writing new data of a first block size using an additional mode referred to herein as a write-write mode. In particular, the write-write mode includes two write operations. The first write operation includes writing old data from a destination block of a second block size of a data drive to a first buffer with new data of the second block size. The old data may be written according to address information of the old data and the first block may include the new data. The second write operation includes writing zeros to a second buffer of the second block size according to the address information of the old data. The zeros written in the second buffer may correspond with the old data written in the first buffer.

The atomic read-modify-write operations that XOR-on-the-fly may still be utilized, as well as the associated operations, with the write-write mode. However, by using the write-write mode in addition to the atomic read-modify-write operations that XOR-on-the-fly and associated operations, performance may be improved without a significant impact on the corresponding hardware and firmware environment.

Figure 1:
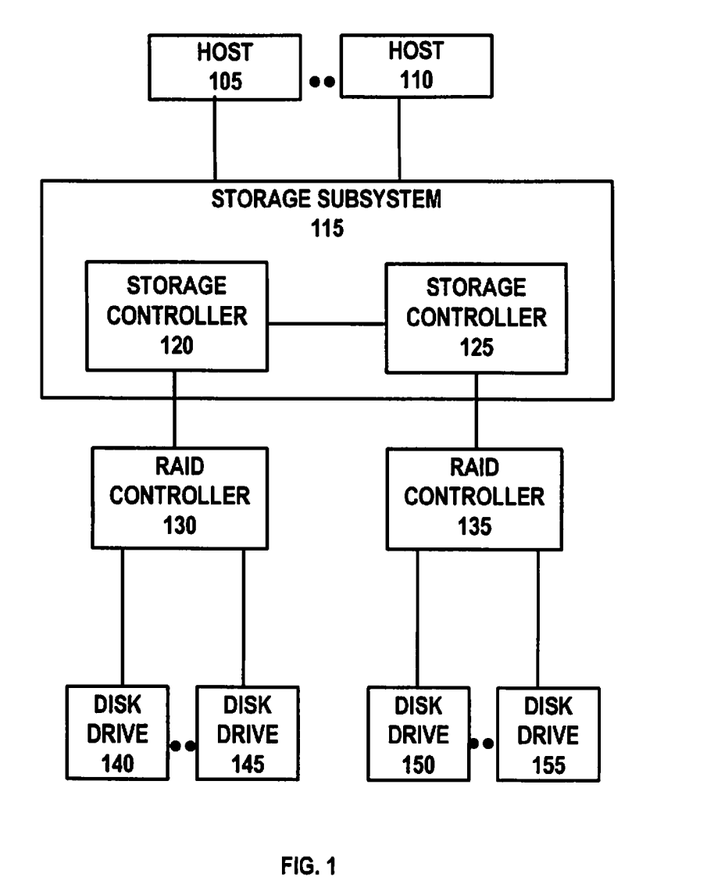
FIG. 1 is a block diagram of an embodiment of a computing system configured to write new data of a first block size to a second block size using a write-write mode.

FIG. 1 illustrates a block diagram of a computing system 100 that may include at least one host (e.g., hosts 105, 110). Each of the hosts 105, 110 may include a plurality of blocks of a first block size of about 512 bytes or multiples thereof. The first block size of about 512 bytes may be, but is not limited to, 512 bytes, 516 bytes, 520 bytes, 524 bytes, 528 bytes, or any combination thereof. The hosts 105, 110 are coupled to a storage subsystem 115. The storage system 115 may include at least one storage controller, such as storage controllers 120, 125. Each of the storage controllers 120, 125 may be coupled to at least one RAID controller, such as RAID controllers 130, 135. The RAID controllers 130, 135 may each be coupled to at least one disk drive, such as disk drives 140, 145, 150, 155. The disk drives 140, 145, 150, 155 may be configured in any RAID configuration, such as RAID-5 or RAID-6, and store parity and data.

Furthermore, each of the disk drives 140, 145, 150, 155 may include a plurality of blocks of a second block size of about 4 KB or multiples thereof. The second block size of about 4 KB may be, but is not limited to, 4,096 bytes, 4,224 bytes, or any combination thereof. Thus, the disk drives 140, 145, 150, 155 may be in a RAID configuration with a second block size of about 4 KB. However, those of ordinary skill in the art will appreciate that block sizes may increase as technology progresses, and as such, the scope of the claims and any embodiments discussed herein is not limited to block sizes of about 4 KB and about 512 bytes.

Each of the hosts 105, 110, the storage controllers 120, 125, and the RAID controllers 130, 135 may be any suitable computational device such as a personal computer, a workstation, a client, a server, a mainframe, a hand held computer, a palm top computer, a telephony device, a network appliance, a blade computer, other computer, or any combination thereof. Each of the disk drives 140, 145, 150, 155 may be any suitable physical hard disk, solid state disk, optical disk, other disk, or any combination thereof. The storage controller 120 may also be combined with the RAID controller 130 into a single storage controller 200 as shown in FIG. 2.

In embodiments shown herein, the hosts 105, 110 may be configured to use a block size of about 512 bytes or multiples thereof, and may request to write new data in the block size of about 512 bytes to at least one of the disk drives 140, 145, 150, 155. The request may be received by the storage subsystem 115, processed by the storage controllers 120, 125, and the request may be passed to the RAID controllers 130, 135. The RAID controllers 130, 135 may use the Write-Write mode as well the XOR-on-the-fly mode and as other instructions, and the RAID controllers 130, 135 may write to at least one of the disk drives 140, 145, 150, 155.

Figure 2:
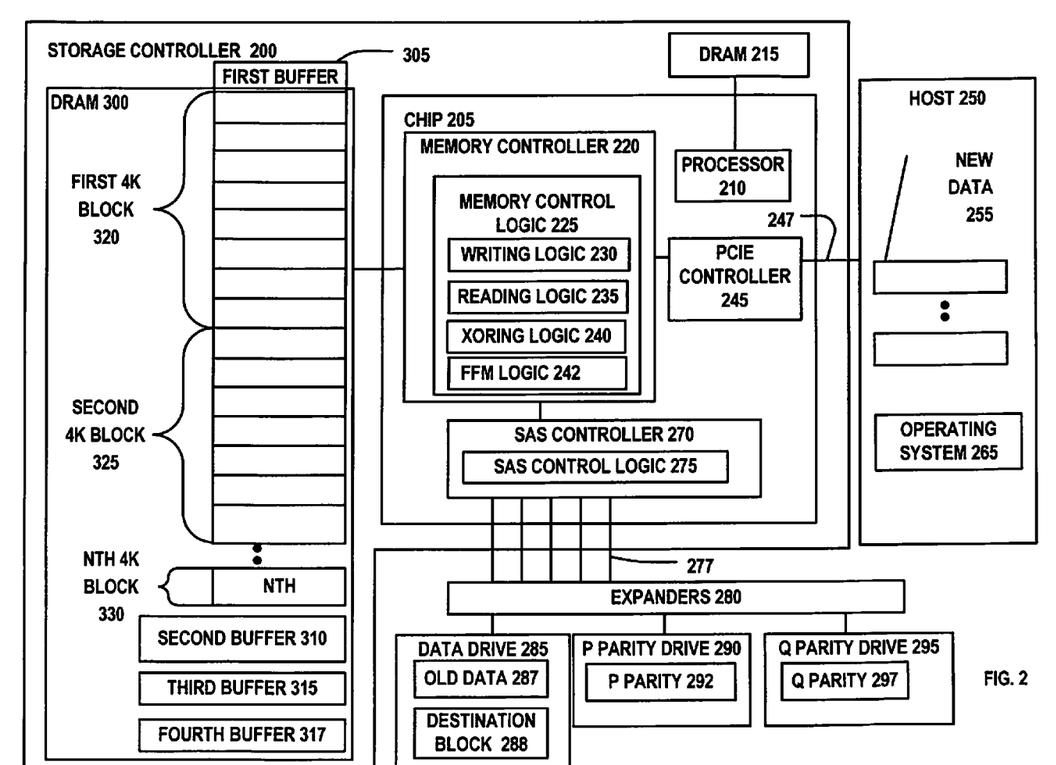
FIG. 2 is a block diagram illustrating in greater detail the primary hardware entities used to implement an embodiment of a storage controller consistent with the computing system of FIG. 1.

FIG. 2 illustrates the primary hardware entities used to implement an apparatus that includes a memory and a processor configured to execute a process that accesses the memory. The apparatus may be an embodiment of a storage controller 200 of FIG. 2, similar to the storage controllers 120, 125 of FIG. 1 combined with the RAID controller 135 of FIG. 1.

The storage controller 200 may include integrated circuitry, such as a microchip, or chip 205. The chip 205 may include a processor, such as an embedded processor 210. The processor 210 may manipulate the storage controller 200, and more specifically, a memory controller 220, a SAS controller 270, a PCIe controller 245 or any combination thereof to execute the write-write mode, the atomic read-modify-write operations that XOR-on-the-fly, associated operations, or any combination thereof. The processor 210 may be coupled via a bus to at least one memory, for example, a memory external to the chip 205, such as DRAM 215. The DRAM 215 may be utilized as control store.

The storage controller 200 may also include a memory controller 220 with memory control logic 225, such as writing logic 230, reading logic 235, xoring logic 240, and FFM logic 242. The memory control logic 225 may be hardware and include at least one gate, such as an XOR gate for the xoring logic 240. Furthermore, the memory control logic 225 receives an indication that indicates whether the write-write mode is selected and should be utilized. If the indication indicates that the write-write mode is selected, the memory control logic 225 may perform the two write operations of the write-write mode. Moreover, the memory control logic 225 may still perform the atomic read-modify-write operations that XOR-on-the-fly, as well as associated operations, when the write-write mode is utilized (as discussed further in connection with FIG. 3 and FIG. 4).

The memory controller 220 may be coupled via a bus to a Peripheral Component Interconnect Express or PCIe controller 245. The PCIe controller 245 may be further coupled to at least one host 250 by at least one PCIE bus 247. The PCIE bus 247 may be utilized to connect with the host 250 and for direct memory access (DMA) data flow.

The host 250 may be similar to the hosts 105, 110 of FIG. 1 and will typically be external to the chip 205. The host 250 may include new data 255 that is in at least one block of the first block size of about 512 bytes or multiples thereof (e.g., 512 bytes, 516 bytes, 520 bytes, 524 bytes, 528 bytes, or any combination thereof) and a first size LBA. The new data 255 may include at least one data value in at least one block. The host 250 may also include an operating system 265 that is configured to use the first sector size of about 512 bytes for accesses even when physical disk drives are configured to the second sector size of about 4 KB (e.g., 4096, 4224, or any combination thereof). Indeed, the new data 255 may store CKD records, and each CKD record may be aligned to the 512 byte block boundary. The host 250 may also include direct memory data access (DMA) control logic (not shown).

The processor 210 may convert the command received from the host 250 from the first block size and first size LBA to the second block size and second size LBA. The processor 210 may also derive the pre-data size and post-data size. For example, when the first sector size is 512 bytes and the second sector size is 4K, then the first size LBA divided by 8 may be the second size LBA, or the first size LBA divided by 8 may be used to map to the second size LBA. When the first size LBA modulo 8 is non-zero, then this result (1 to 7)×512 bytes may be the pre-data size. The second block size may be equal to the sum of the first block size plus the pre-data size rounded up to a 4K multiple. The round up value may be the post-data size. The pre-data size and post-data size may be the amount of data at the start and end of the second block size of data drive 285 old data 287 that may not change when the second block size is written to the data drive 285. The second block size, second block LBA, pre-data size, and post-data size may be passed to the SAS controller 270. As such, when the SAS controller 270 reads the old data 287 as part of a RAID-5 or RAID-6 write operation, then the SAS controller 270 may select the Write-Write mode when the pre-data and post-data is passed to the memory controller 220 and may select XOR-on-the-fly for the rest of the second block size transfer.

The memory controller 220 may be further coupled via a bus to a SAS controller 270 with SAS control logic 275. The SAS controller 270 may be similar to the RAID controllers 130, 135 of FIG. 1. The SAS control logic 275 may be utilized for DMA data flow and may be hardware. The SAS controller 270 may be further coupled to expanders 280 by at least one SAS bus 277. The expanders 280 may be external to the chip 205 with the expanders 280 further coupled at least one disk drive. For example, the expanders 280 may be coupled to a data drive 285 with old data 287, a P parity drive 290 with P parity 292, and a Q parity drive 295 with Q parity 297. New P parity and new Q parity may be generated and stored in the P parity drive 290 and the Q parity drive 295, respectively. Each of the old data 287, P parity 292, Q parity 297, the new P parity, and the new Q parity may include at least one data value in at least one block. In general, the SAS bus 277 may be utilized to connect with the data drive 285, the P parity drive 290, and the Q parity drive 295 through the expanders 280.

The drives may be external to the chip 205 and may be similar to the disk drives 140, 145, 150, 155 of FIG. 1. The data drive 285, the P parity drive 290, and the Q parity drive 295 may each have a plurality of blocks of the second block size of about 4 KB, such as, but not limited to, 4096 bytes, 4224 byes, or any combination thereof. Each block of the data drive 285, the P parity drive 290, and the Q parity drive 295 may be accessed using linear block accessing data or LBA. The P parity drive 290 may be read from and written to in both the RAID-5 and the RAID-6 configurations. However, the Q parity drive 295 may be utilized with the RAID-6 configuration.

The new data 255 may be written to the data drive 285. In particular, the new data 255 may be written to at least one destination block, such as destination block 288, of the data drive 285. For simplicity, the term "destination block" may be utilized herein to reference a block of the data drive 285 where the new data 255 will be written based on address information (e.g., the LBA) of the new data 255. For example, the host 250 may request the new data 255 be written to certain LBA's of the first block size, and the destination block 288 may be a block from the data drive 255 where those LBA's are stored. The destination block 288, including its old data 287, may be read from the data drive 285, and after the operations of the write-write mode and the atomic read-modify-write operations that XOR-on-the-fly, the new data 255 may be written to the destination block 288 of the data drive 285. In short, a host may request an operation of size X, starting at drive LBA Y. Firmware may temporarily allocate buffers in DRAM, such as two buffers, each of size X plus the pre-data and post-data size for operations discussed herein. Thus, in some embodiments, a table may not be involved.

The SAS control logic 275 may perform read operations, write operations, or any combination thereof involving the data drive 285, the P parity drive 290, and Q parity drive 295. The SAS control logic may also pass information from the drives, as necessary, to the memory control logic 220. Furthermore, the SAS control logic 275 may determine whether or not the Write-Write mode or the XOR-on-the-fly mode is selected and should be utilized by the memory control logic 220. For example, the SAS control logic 275 may compare the block size and starting alignment of the new data 255 and the block size of at least one of the data drive 285. If the block size of new data from the host 250 is less than the block size of the data drive 285, or less than a threshold (e.g., a 4 KB threshold), then based on the comparison, the SAS control logic 275 may pass an indication (e.g., a bit, a trigger, a signal, other indication, or any combination thereof) to the memory controller 220 to indicate that the Write-Write mode is selected and should be utilized.

In particular, the SAS control logic 275 may indicate that the Write-Write mode or XOR-on-the-fly mode is selected as follows. A SAS controller 270 transfer to the memory control logic 225 for a read of the old data drive 285 may be one or more partial transfers of the second block size. The SAS controller 270 may break the transfers to the memory control logic 225 when the mode switches between XOR-on-the-fly and Write-Write mode. The SAS controller 270 may pass to the memory control logic 225 the following signals when it issues the write XOR-on-the-fly command or the Write-Write command.

1-bit to select the Write-Write mode
1-bit to select XOR-on-the-fly
1-bit to also select RAID-6
8-bit RAID-6 constant
Address pointing to the first buffer 305
Address pointing to the second buffer 310

Moreover, the SAS control logic 275 may determine if it should pass an indication that the Write-Write mode is selected as follows. For instance, the SAS command block (CB) that firmware may build has the control information in it. Moreover, if there is a 4K drive (1-bit in the CB selects this) and if the operation starts at a sub-block offset, then for the first N sub-blocks up to that offset, the Write-Write mode may be used. Also, the CB has an operation length, if that length completes before the end of the last 4K, then those sub-blocks may also use the Write-Write mode.

The memory controller 220 may be further coupled via a bus to at least one memory, such as DRAM 300, that is external to the chip 205. The DRAM 300 may include at least one buffer, such as a first buffer 305, a second buffer 310, a third buffer 315, and a fourth buffer 317. The fourth buffer 317 may be utilized for the finite field multiplication in a RAID-6 configuration, and may be omitted in a RAID configuration without finite field multiplication, such as the RAID-5 configuration. The buffers 305, 310, 315, 317 may be temporary DRAM locations used for operations.

Each of the first buffer 305, the second buffer 310, the third buffer 315, and the fourth buffer 317 may be of the second block size of about 4 KB or multiple thereof (e.g., 4096 4224, or any combination thereof) because the data drive 285, the P parity drive 290, and Q parity drive 295 are of the second block size of about 4 KB. However, if the data drive 285, the P parity drive 290, the Q parity drive 295, or any combination thereof was of a block size other than about 4 KB, then the block size of the first buffer 305, the second buffer 310, the third buffer 315, the fourth buffer 317, or any combination thereof may be of that other block size. Furthermore, the first block size may be less than or simply different than the second block size. The write-write mode writes to the first buffer 305 and the second buffer 310.

Data may be placed in a particular sector of a block of the first buffer 305, the second buffer 310, the third buffer 315, the fourth buffer 317, or any combination thereof based on the address information (e.g., LBA) of the data (e.g., new data 255, old data 287, or other data) to be written, read, or any combination thereof. Indeed, LBA addressing may be utilized with all of the drives and buffers discussed herein.

The first buffer 305 may include at least one 4 KB block, such as first 4 KB block 320, a second 4 KB block 325, and a nth 4 KB block 330. The memory controller 220 may perform any read operations, write operations, XOR operations, FFM operations, or any combination thereof involving the first buffer 305, the second buffer 310, the third buffer 315, and the fourth buffer 317.

Turning next to the operation of the storage controller 200, in connection with the atomic read-modify-write operations that XOR-on-the-fly, the SAS control logic 275 may pass the data read from the data drive 285 to the memory control logic 225 along with two addresses, the address for the first buffer 305 and the second buffer 310. The memory control logic 225 issues the DRAM read to the first buffer 305 (i.e., read), XORs this data with the new data 255 received from the SAS control logic 275 (i.e., modify), and writes it to the second buffer 310.

Indeed, in connection with the atomic read-modify-write operations that XOR-on-the-fly and associated operations, for RAID-5, the storage controller 200 allocates three buffers (e.g., the first buffer 305, the second buffer 310, and the third buffer 315) and performs the following operations, which include the atomic read-modify-write operations that XOR-on-the-fly at (b) and associated operations at (a), (c)-(e):

(a) the new data 255 is received and written to a first buffer 305;

(b) the data drive 285 is read (i.e., read) and that old data 287 is XOR'ed with the first buffer 305 (i.e., modify) and written in the second buffer 310 (i.e., write);

(c) the new data 255 in the first buffer 305 is written to the data drive 285;

(d) the P parity 292 is read from the P parity drive 290, XOR'ed with the second buffer 310, and placed in the third buffer 310; and (e) the third buffer 310 with new P parity is written to the P parity drive 290.

In connection with the atomic read-modify-write operations that XOR-on-the-fly and associated operations, for RAID-6, the storage controller 200 allocates an additional fourth buffer 317 for FFM and performs the following operations, which include the atomic read-modify-write operations that XOR-on-the-fly at (b) and associated operations at (a), (c)-(f):

(a)-(d) operations above, except that FFM with the fourth buffer 317 is performed before xoring;

(e) the Q parity 297 is read from the Q parity drive 295 and XOR'ed with the second buffer 310 and placed in a third buffer 315; and (f) the third buffer 315 with the new Q parity is written to the Q parity drive 295.

However, the memory control logic 225 may additionally utilize the write-write mode to potentially improve performance over the atomic read-modify-write operations that XOR-on-the-fly and associated operations. Specifically, the write-write mode may be added as a mode to be utilized, as necessary, in conjunction with the atomic read-modify-write operations that XOR-on-the-fly and the associated operations. For instance, the SAS control logic 275 may be kept substantially the same, and may still issue a write to the memory control logic 225 and provide two addresses. However, the SAS control logic 275 may be changed to provide an indication that the write-write mode is selected. When this indication indicates that the write-write should be utilized, the memory control logic 225 may issue the write to the first buffer 305 and may then issue a write of zeros to the second buffer 310. The SAS control logic 275 may also be changed to determine whether or not the write-write should be utilized.

Therefore, in connection with the write-write mode, the storage controller 200 may receive a request from the operating system 265 of the host 250 via the PCIE bus 247 to write the new data 255 of blocks of about 512 bytes. In response to receiving the request, the SAS control logic 275 of the SAS controller 270 reads the data drive 285, as necessary, and passes the old data 287 to the memory controller 220. A command block (e.g., created by firmware) for the SAS control logic 275 may include two memory controller 220 addresses (e.g., for the first buffer 305 and the second buffer 310) that are passed to the memory controller 220, as well an extra field (e.g., fourth buffer 317) for the finite field multiplication in a RAID-6 configuration. The SAS control logic 275 also issues a read operation, write operation, or any combination thereof, as necessary, to the memory controller 200. The SAS control logic 275 may also determine if the write-write should be selected and passes an indication to the memory controller 220 indicating that the write-write mode should be utilized.

The memory control logic 225 of the memory controller 200 responds to the read operation(s) and the write operation(s) issued by the SAS control logic 275. For example, the memory control logic 225 may use the write-write mode, and may write to the two addresses for the first buffer 305 and the second buffer 310, as necessary. In particular, the writing logic 230 of the memory control logic 225 may write the old data to the first buffer 305 (i.e., write) and may write zeroes to the second buffer 310 (i.e., write).

The memory control logic 225 passes the first buffer 305 to the SAS control logic 225, and the SAS control logic 225 writes the first buffer 305 to the data drive 285. Additional read operations, writes operations, xoring operations, FFM operations, or any combination thereof, such as operations of the atomic read-modify-write operations that XOR-on-the-fly and associated operations, may be performed by the SAS control logic 275, the memory control logic 225, or any combination thereof as discussed herein. For instance, the xoring logic 240 may XOR the first buffer 305 with the old data 287 from the data drive 285 received from the SAS control logic 275, per the atomic read-modify-write operations that XOR-on-the-fly.

Figure 3:
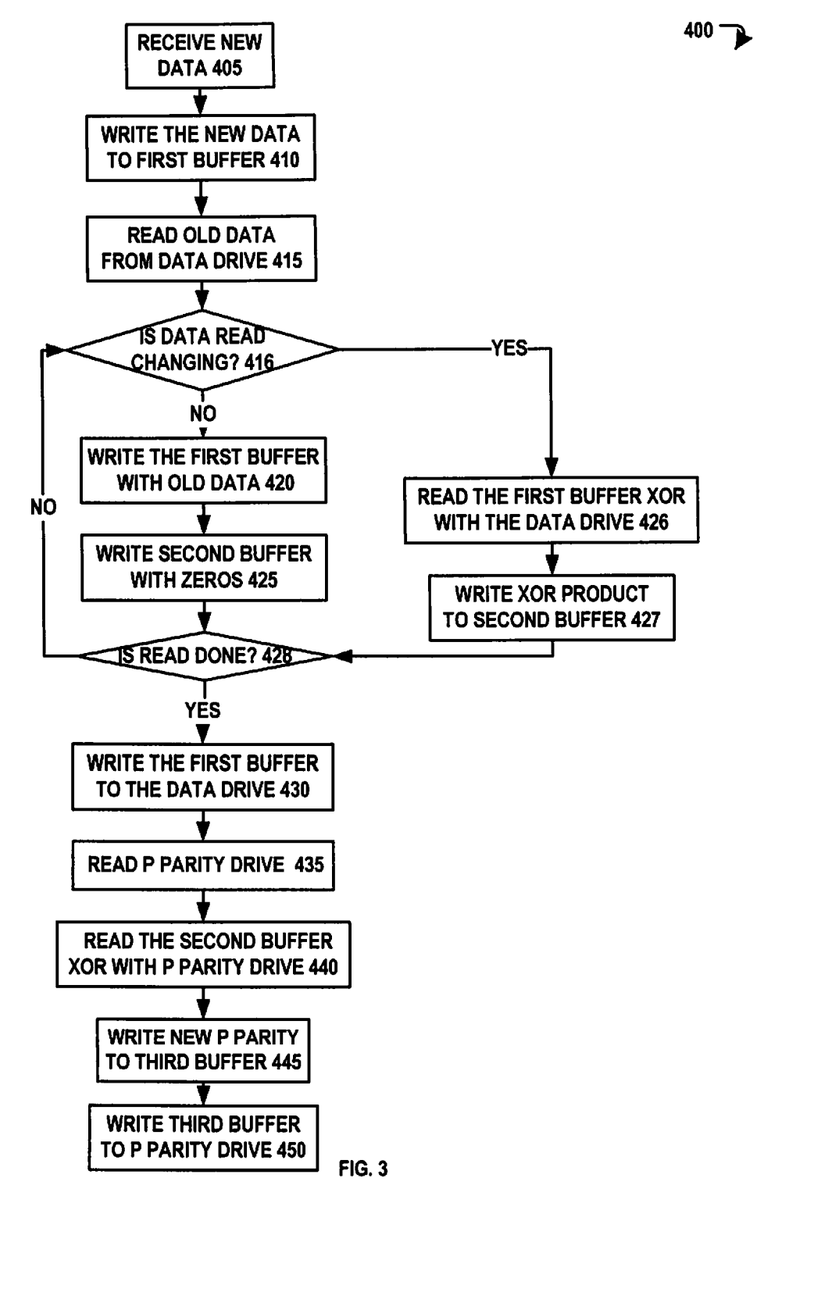
FIG. 3 is a flowchart of an embodiment of a method of writing new data of a first block size in a RAID-5 application.
Figure 5:
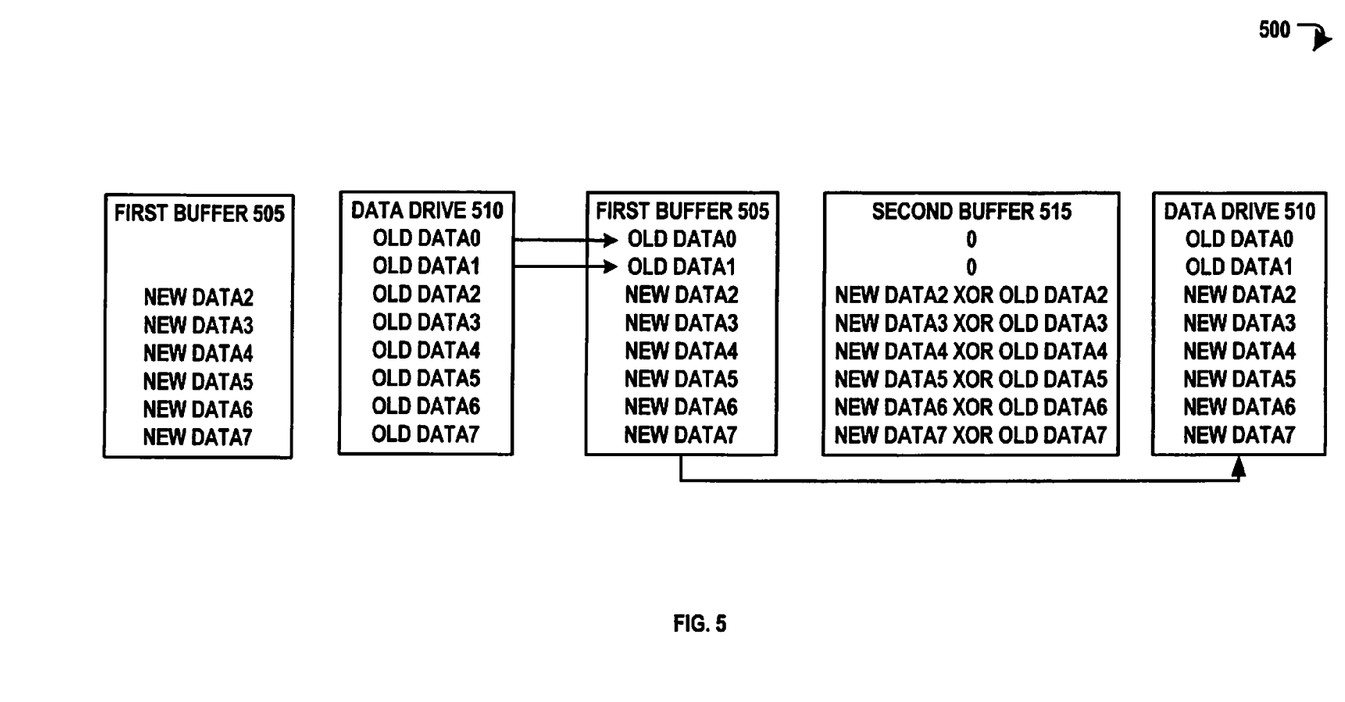
FIG. 5 is one example of a first buffer, a second buffer, and a data drive during execution of a portion of the embodiments of the methods of writing new data of a first block size of FIG. 3 and FIG. 4.

FIG. 3 shows an embodiment of a method of writing new data of a first block size. The method 400 may be for a RAID-5 configuration and may be executed by the storage controller 200 of FIG. 2 or the storage controllers 120, 125 of FIG. 1. The method 400 may also use the first buffer 305, the second buffer 310, and the third buffer 315 of FIG. 2, as well as the data drive 287 and the P parity drive 290 of FIG. 2. Each of the buffers and drives may be of a block size that is about 4 KB. For ease of understanding, FIG. 5 includes one example 500 illustrating a first buffer 505 similar to the first buffer 305 of FIG. 2, a data drive 510 similar to the data drive 285 of FIG. 2, and a second buffer 515 similar to the first buffer 310 of FIG. 2 during execution of the write-write mode and atomic read-modify-write operations that XOR-on-the-fly of the method 400. Afterwards, the remaining associated operations may be executed using the first buffer 505 and the second buffer 515 to generate new parity information. Although one destination block 288 of FIG. 2 is referenced in the description of FIG. 3 and FIG. 5, those of ordinary skill in the art will appreciate that there may be a plurality of the destination blocks 288 from the data drive 285.

The storage controller may receive new data, at 405. For example, the storage controller 200 of FIG. 2 may receive a request from the operating system 265 of the host 250 via the PCIE bus 247 through the PCIe controller 245 to write the new data 255 of blocks of about 512 bytes. The request may include the address information of the new data 255, such as at least one LBA where the new data 255 should be written.

In response to receiving the new data 255, the PCIe controller 245 issues a write to the memory control logic 225 with the new data 255 and the LBA's. The new data may be written to a first buffer, at 410. For example, the writing logic 230 of the memory control logic 225 of FIG. 2 may write the new data 255 to the first buffer 305 according to the address information of the new data 255, including any offsets. The first buffer 305 may only have the new data 255 in it at 410, as illustrated by the first buffer 505 of FIG. 5.

The old data may be read from a data drive, at 415. For example, the SAS control logic 275 of the SAS controller 270 of FIG. 2 may read the old data 287 from the data drive 285, as illustrated by the data drive 510 of FIG. 5. In particular, the SAS control logic 275 may utilize the LBA's of the new data to identify the destination block 288 where the new data 255 will be written, and read the old data 287 of the destination block 288.

A determination may be made at 416 as to whether the data read is changing or not. When the read data is changing, then XOR-on-the-fly mode may be utilized to calculate delta data, and control may pass to 426 and 427. If not, then the Write-Write mode may be utilized such that the old data may be preserved and delta data may be zero, and control may pass to 420 and 425. Turning to 420, assuming the memory control logic 225 received the indication to utilize the Write-Write mode, the old data may be written to the first buffer, at 420, and this prevents that old data from changing. For example, the writing logic 230 of the memory control logic 225 of FIG. 2 may write the old data 287 to the first buffer 305 (i.e., first Write operation), as illustrated in the first buffer 505 of FIG. 5. The old data 287 from the destination block 288 may be written according to the address information of the old data 287. The first buffer 305 may finish loading at this point.

Additionally, a second buffer may be written by zeroes, at 425. The second buffer is the difference between the old data and the new data, and as the old data is not changing, the result is zero. Indeed, the second buffer may be used to track changes or delta data. For example, the writing logic 230 of the memory control logic 225 of FIG. 2 may write zeroes to the second buffer 310 (i.e., the second write operation), as further illustrated by the second buffer 515 of FIG. 5. The zeroes may be written according to the address information of the old data 287. In particular, zeroes may be written in the second buffer 310 to correspond with the old data 287 in the first buffer 305. Indeed, the zeros in the second buffer 310 and the old data 287 written in the first buffer 305 may correspond by the LBA's.

The first buffer may be read and XOR'ed with the old data that was read from the data drive, at 426. In particular, the atomic read-modify-write operations that XOR-on-the-fly may be executed for the new data. For example, the reading logic 235 of the memory control logic 225 of FIG. 2 may read the first buffer 305. Moreover, the xoring logic 240 may XOR the first buffer 305 with the old data 287. The second buffer may be written with the XOR product, at 427 according to the address information of the new data 255. For example, the writing logic 230 of the memory control logic 225 of FIG. 2 may write the XOR product to the second buffer 310 to correspond with the new data 255, as further illustrated by the second buffer 515 of FIG. 5.

Of note, 420, 425, 426, 427, or any combination thereof may be executed multiple times, in a different order, or both. For example, it is worth noting that not all of the old data 287 may be available at the same time for writing to the first buffer 305. Thus, 420 and 425 may be performed as many times as necessary to write the old data 287 to the first buffer 305 and write the zeroes to the second buffer 305. For example, at 428, a determination may be made as to whether the read is done. When the read is not done, control may pass to 416 of the illustrated loop to restart the loop. When the read is done, the loop may have completed and control may pass to 430. Indeed, 416 through 428 may loop every 512/528 until the disk read data has all been processed. Nonetheless, next, the associated operations may be executed and may generate parity information.

The first buffer may be written to the data drive, at 430. For example, the SAS control logic 275 of the SAS controller 270 of FIG. 2 may write the new data 255 and the old data 285 of the first buffer 305 to the destinations block 288 of the data drive 285, as further illustrated by the data drive 510 of FIG. 5.

P Parity may be read from a P parity drive, at 435. For example, the SAS control logic 275 of the SAS controller 270 of FIG. 2 may read P parity 292 of the P parity drive 290 according to address information of the P parity. For instance, the P parity 292 that corresponds with the LBA's of the data in the destination block 288 may be read.

The second buffer may be read and XOR'ed with the P parity read from the P parity drive, at 440. For example, the reading logic 235 of the memory control logic 225 of FIG. 2 may read the second buffer 310. Moreover, the xoring logic 240 may XOR the second buffer 310 with the P parity 292 from the P parity drive 290 to generate the new P parity.

A third buffer may be written with the XOR product (i.e., the new P parity), at 445. For example, the writing logic 230 of the memory control logic 225 of FIG. 2 may write the XOR product to the third buffer 315.

The third buffer may be written to the P parity drive, at 450. For example, the SAS control logic 275 of the SAS controller 270 of FIG. 2 may write the new P parity for the destination block 288 in the third buffer 315 to the P parity drive 290.

Figure 4:
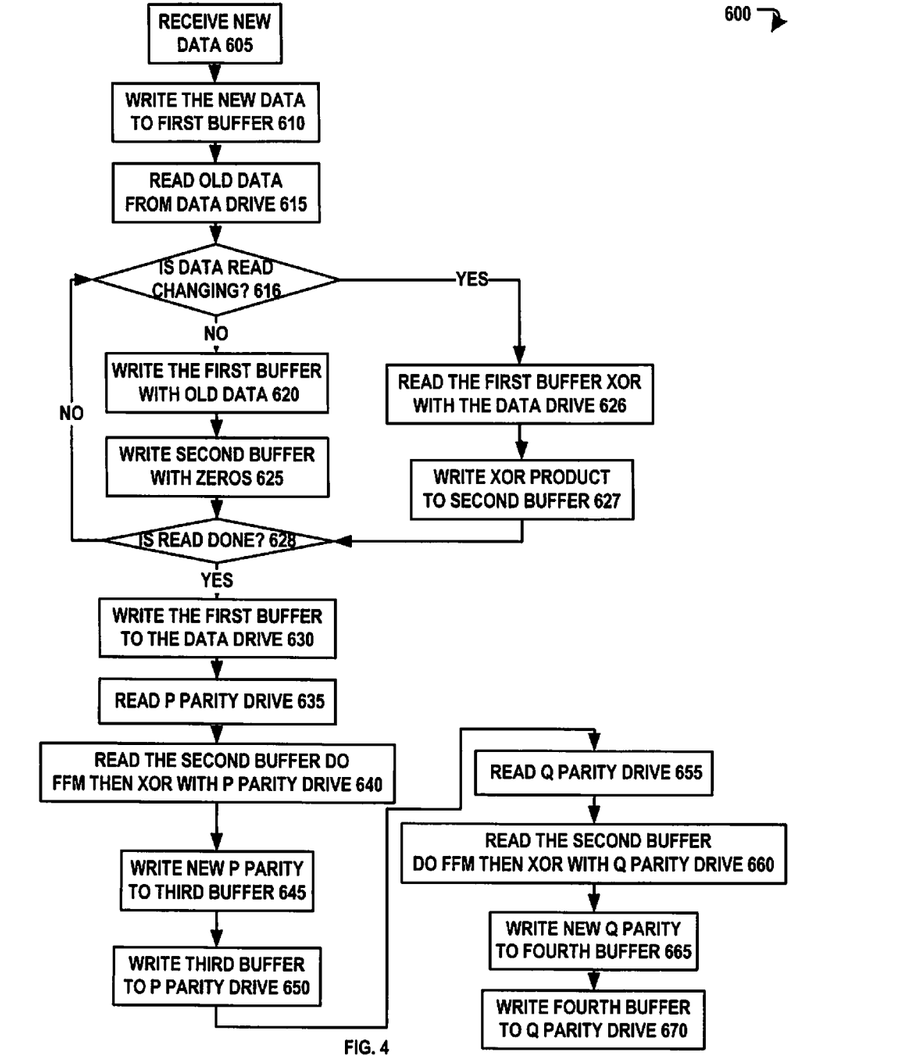
FIG. 4 is a flowchart of another embodiment of a method of writing new data of a first block size in a RAID-6 application.

FIG. 4 shows an embodiment of a method of writing new data of a first block size. The method 600 may be for a RAID-6 configuration and may be executed by the storage controller 200 of FIG. 2 or the storage controllers 120, 125 of FIG. 1. The method 400 may also use the first buffer 305, the second buffer 310, the third buffer 315, the fourth buffer 317 of FIG. 2, as well as the data drive 287, the P parity drive 290, and the Q parity drive 295 of FIG. 2. Each of the buffers and drives may be of a block size that is about 4 KB. For ease of understanding, FIG. 5 includes one example 500 illustrating a first buffer 505 similar to the first buffer 305 of FIG. 2, a data drive 510 similar to the data drive 285 of FIG. 2, and a second buffer 515 similar to the first buffer 310 of FIG. 2 during execution of the write-write mode and atomic read-modify-write operations that XOR-on-the-fly of the method 600. Afterwards, the remaining associated operations may be executed using the first buffer 505 and the second buffer 515 to generate new parity information. Although one destination block 288 of FIG. 2 is referenced in the description of FIG. 4 and FIG. 5, those of ordinary skill in the art will appreciate that there may be a plurality of the destination blocks 288 from the data drive 285. The method 600 of FIG. 4 is similar to the method 400 of FIG. 3 except for the Q parity and FFM related operations.

The storage controller may receive new data, at 605. For example, the storage controller 200 of FIG. 2 may receive a request from the operating system 265 of the host 250 via the PCIE bus 247 through the PCIe controller 245 to write the new data 255 of blocks of about 512 bytes. The request may include the address information of the new data 255, such as at least one LBA where the new data 255 should be written.

In response to receiving the new data 255, the PCIe controller 245 issues a write to the memory control logic 225 with the new data 255 and the LBA's. The new data may be written to a first buffer, at 610. For example, the writing logic 230 of the memory control logic 225 of FIG. 2 may write the new data 255 to the first buffer 305 according to the address information of the new data 255, including any offsets. The first buffer 305 may only have the new data 255 in it at 610, as illustrated by the first buffer 505 of FIG. 5.

The old data may be read from a data drive, at 615. For example, the SAS control logic 275 of the SAS controller 270 of FIG. 2 may read the old data 287 from the data drive 285, as illustrated by the data drive 510 of FIG. 5. In particular, the SAS control logic 275 may utilize the LBA's of the new data to identify the destination block 288 where the new data 255 will be written, and read the old data 287 of the destination block 288.

A determination may be made at 616 as to whether the data read is changing or not. When the read data is changing, then XOR-on-the-fly mode may be utilized to calculate delta data, and control may pass to 626 and 627. If not, then the Write-Write mode may be utilized such that the old data may be preserved and delta data may be zero, and control may pass to 620 and 625. Turning to 620, assuming the memory control logic 225 received the indication to utilize the write-write mode, the old data may be written to the first buffer, at 620, and this prevents that old data from changing. For example, the writing logic 230 of the memory control logic 225 of FIG. 2 may write the old data 287 to the first buffer 305 (i.e., first write operation), as illustrated in the first buffer 505 of FIG. 5. The old data 287 from the destination block 288 may be written according to the address information of the old data 287. The first buffer 305 may finish loading at this point.

Additionally, a second buffer may be written by zeroes, at 625. The second buffer is the difference between the old data and the new data, and as the old data is not changing, the result is zero. Indeed, the second buffer may be used to track changes or delta data. For example, the writing logic 230 of the memory control logic 225 of FIG. 2 may write zeroes to the second buffer 310 (i.e., the second write operation), as further illustrated by the second buffer 515 of FIG. 5. The zeroes may be written according to the address information of the old data 287. In particular, zeroes may be written in the second buffer 310 to correspond with the old data 287 in the first buffer 305. Indeed, the zeros in the second buffer 310 and the old data 287 written in the first buffer 305 may correspond by the LBA's.

The first buffer may be read and XOR'ed with the old data that was read from the data drive, at 626. In particular, the atomic read-modify-write operations that XOR-on-the-fly may be executed for the new data. For example, the reading logic 235 of the memory control logic 225 of FIG. 2 may read the first buffer 305. Moreover, the xoring logic 240 may XOR the first buffer 305 with the old data 287. The second buffer may be written with the XOR product, at 627 according to the address information of the new data 255. For example, the writing logic 230 of the memory control logic 225 of FIG. 2 may write the XOR product to the second buffer 310 to correspond with the new data 255, as further illustrated by the second buffer 515 of FIG. 5.

Of note, 620, 625, 626, 627, or any combination thereof may be executed multiple times, in a different order, or both. For example, it is worth noting that not all of the old data 287 may be available at the same time for writing to the first buffer 305. Thus, 620 and 625 may be performed as many times as necessary to write the old data 287 to the first buffer 305 and write the zeroes to the second buffer 305. For example, at 628, a determination may be made as to whether the read is done. When the read is not done, control may pass to 616 of the illustrated loop to restart the loop. When the read is done, the loop may have completed and control may pass to 630. Indeed, 616 through 628 may loop every 512/528 until the disk read data has all been processed. Nonetheless, next, the associated operations may be executed and may generate parity information.

The first buffer 305 may be written to the data drive, at 630. For example, the SAS control logic 275 of the SAS controller 270 of FIG. 2 may write the new data 255 and the old data 285 of the first buffer 305 to the destinations block 288 of the data drive 285, as further illustrated by the data drive 510 of FIG. 5.

P Parity may be read from a P parity drive, at 635. For example, the SAS control logic 275 of the SAS controller 270 of FIG. 2 may read P parity 292 of the P parity drive 290 according to address information of the P parity. For instance, the P parity 292 that corresponds with the LBA's of the data in the destination block 288 may be read.

The second buffer 310 may be read, finite field multiplication may be performed to generate finite field multiplication data, and the finite field multiplication data may be XOR'ed with the P parity read from the P parity drive, at 640. For example, the reading logic 235 of the memory control logic 225 of FIG. 2 may read the second buffer 310, and the FFF logic 242 may perform finite field multiplication to the second buffer 310 to generate the finite field multiplication data. Moreover, the xoring logic 240 may XOR the finite field multiplication data with the P parity 292 from the P parity drive 290 to generate the new P parity.

The third buffer 315 may be written with the XOR product (i.e., the new P parity), at 645. For example, the writing logic 230 of the memory control logic 225 of FIG. 2 may write the XOR product to the third buffer 315.

The third buffer 315 may be written to the P parity drive, at 650. For example, the SAS control logic 275 of the SAS controller 270 of FIG. 2 may write the new P parity for the destination block 288 in the third buffer 315 to the P parity drive 290.

Q Parity may be read from a Q parity drive, at 655. For example, the SAS control logic 275 of the SAS controller 270 of FIG. 2 may read Q parity 297 of the Q parity drive 295 according to address information of the Q parity. For instance, the Q parity 297 that corresponds with the LBA's of the data in the destination block 288 may be read.

The second buffer 310 may be read, finite field multiplication may be performed to generate additional finite field multiplication data, and the additional finite field multiplication data may be XOR'ed with the Q parity read from the Q parity drive, at 660. For example, the reading logic 235 of the memory control logic 225 of FIG. 2 may read the second buffer 310, and the FFF logic 242 may perform finite field multiplication to the fourth buffer 310 to generate the additional finite field multiplication data. Moreover, the xoring logic 240 may XOR the additional finite field multiplication data with the Q parity 297 from the Q parity drive 295 to generate the new Q parity.

The fourth buffer 317 may be written with the XOR product (i.e., the new Q parity), at 665. For example, the writing logic 230 of the memory control logic 225 of FIG. 2 may write the XOR product to the fourth buffer 317.

The fourth buffer 317 may be written to the Q parity drive, at 670. For example, the SAS control logic 275 of the SAS controller 270 of FIG. 2 may write the new Q parity for the destination block 288 in the fourth buffer 317 to the Q parity drive 295.

Figure 6:
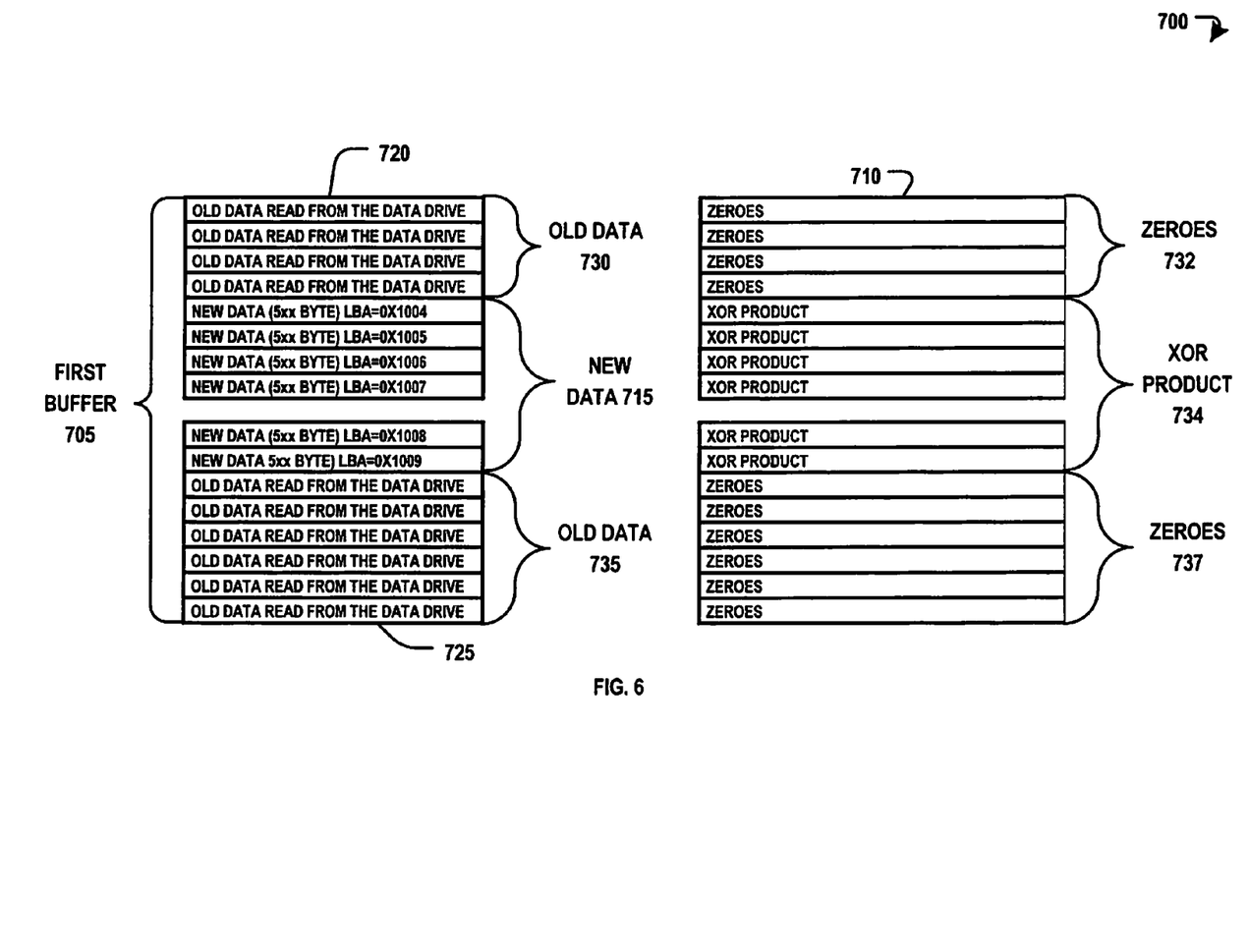
FIG. 6 is another example of a first buffer and a second buffer during execution of a portion of the embodiments of the methods of writing new data of a first block size of FIG. 3 and FIG. 4.

FIG. 6 includes another example 700 illustrating a first buffer 705, similar to the first buffer 305 of FIG. 2, and a second buffer 710, similar to the first buffer 310 of FIG. 2, during execution of the write-write mode and atomic read-modify-write operations that XOR-on-the-fly of the method 400 of FIG. 3 or the method 600 of FIG. 4. For this example, it is assumed that new data, such as the new data 255 of FIG. 2, is of a block size of about 512 bytes and there are six blocks of new data (i.e., 3 KB of new data). It is also assumed that the first buffer 705 and second buffer 710 are of a second block size of about 4 KB. Moreover, a data drive, such as the data drive 285, also has a block size of about 4 KB.

Specifically, a host, such as the host 250 of FIG. 2, issues a write operation of six blocks of new data to LBA's 0x1004-0x1009. Memory control logic, such as the memory control logic 225, receives and writes the six blocks of new data 715 to two 4 KB blocks 720, 725 of the first buffer 705, starting at a 2 KB offset, at LBA's 0x1004 through 0x1009 of the first buffer 705. Thus, the 3 KB of new data 715 is written to the first buffer 705 of 8 KB. The first buffer 705 may only have 3 KB of the new data 715 in it, as the first 2 KB and the last 3 KB of the first buffer 705 have not been loaded yet with any data.

An 8 KB read may be issued to two destination blocks of the data drive, such as the destination block 288 of the data drive 285 of FIG. 2, to get old data, such as the old data 287. In particular, for this example, it is assumed that LBA's 0x1004-0x1009 are stored in LBA's 0x200-0x201 of the data drive, thus, two destination blocks of the 4 KB block size are read from the data drive. When the first 2 K of old data 730 (i.e., the offset) is received from the data drive, the memory control logic uses the write-write mode indicated by SAS control logic, such as the SAS control logic 275 of the SAS controller 270 of FIG. 2. In particular, the memory control logic places the old data 730 in the first buffer 705 according to address information of the old data 730, and writes zeros 732 in the second buffer 710 according to address information of the old data 730. The zeroes 732 correspond with the old data 730 of the first buffer 705.

When the six 512 bytes of new data 715 are received from the data drive, the memory control logic uses the atomic read-modify-write operations that XOR-on-the-fly to read the first buffer 705 at LBA's 0x1004-0x1009, XORs the new data 715 in those LBA's with the old data of the destination blocks that was in LBA's 0x1004-0x1009, and places this XOR product 734 in the corresponding LBA's of the second buffer 710. When the last 3 KB of old data 735 is received from the data drive, the memory control logic uses the write-write mode, places the old data 735 in the first buffer 705 according to the address information, and writes zeros 737 in the second buffer 710 according to address information of the old data 735. The zeroes 737 correspond with the old data 735 of the first buffer 710. The zeroes 732, 737 in the second buffer 710 may indicate that there is no change as no new data has been written to those corresponding LBA's.

Afterwards, the remaining associated operations discussed at 430-450 of FIGS. 3 and 630-670 may be executed to generate new parity information. For example, the first buffer 705 may be written by the SAS control logic to the two 4 KB blocks of data drive with LBA's 0x200-0x201.

Indeed, those of ordinary skill in the art may appreciate that when a host issues a write of a different block size than the data drive's block size, the write may still be accomplished with potentially an increase in performance and insubstantial changes to the environment. The write may still be accomplished because at least some of the old data from the data drive may be combined with the new data in the first buffer. The memory control logic may simply utilize the Write-Write mode, as needed, in conjunction with the atomic read-modify-write operations that XOR-on-the-fly and the associated operations. Yet, SAS control logic may not change substantially. For example, the SAS control logic may still issue a write to the memory control logic and may still provide two addresses. However, the SAS control may be changed to determine and indicate when the Write-Write mode should be utilized the memory control logic, and changed to pass an indication.

When this indication indicates that the write-write mode should be utilized, the memory control logic may still issue the write to the first buffer and may issue a write of zeros to the second buffer. However, extra buffers may not have to be allocated, extra accesses to a data drive (or other drives) may not need to be added, and extra accesses to the buffers may not need to be added. Instead, the buffers may appear the same to firmware, and the basic flow has generally been maintained. Moreover, the same structure (or substantially similar structure) and design performance, as when the data did match in block size, may be maintained.

Particular embodiments described herein may take the form of an entirely hardware embodiment, an entirely firmware environment, an entirely software embodiment, or an embodiment containing any combination of hardware, firmware, and software elements. In a particular embodiment, the disclosed methods are implemented in software that is embedded in processor recordable and readable storage medium and executed by a processor, which includes but is not limited to firmware, resident software, microcode, etc.

Further, embodiments of the present disclosure, such as the one or more embodiments may take the form of a computer program product accessible from a computer-usable or computer-readable storage medium providing program code for use by or in connection with a computer or any instruction execution system. For the purposes of this description, a computer-usable or recordable computer-readable, non-transitory storage medium can be any apparatus that can tangibly embody a computer program and that can contain, store, communicate, propagate, or transport the program for use by or in connection with the instruction execution system, apparatus, or device.

In various embodiments, the medium can include an electronic, magnetic, optical, electromagnetic, infrared, or semiconductor system (or apparatus or device) or a propagation medium. Examples of a recordable computer-readable storage medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and digital versatile disk (DVD).

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the data processing system either directly or through intervening I/O controllers. Network adapters may also be coupled to the data processing system to enable the data processing system to become coupled to other data processing systems or remote printers or storage devices through intervening private or public networks. Modems, cable modems, and Ethernet cards are just a few of the currently available types of network adapters. The previous description of the disclosed embodiments is provided to enable any person skilled in the art to make or use the disclosed embodiments.

Various modifications to these embodiments will be readily apparent to those skilled in the art, and the generic principles defined herein may be applied to other embodiments without departing from the scope of the disclosure. Thus, the present disclosure is not intended to be limited to the embodiments shown herein but is to be accorded the widest scope possible consistent with the principles and features as defined by the following claims.

The invention claimed is:

1. A method comprising:
receiving, by a storage controller that includes a memory controller and a drive controller, first data of a first block size from a host executing an operating system configured to access blocks of the first block size;
writing, by the storage controller, the first data to a first buffer of a second block size;
reading, by the storage controller, second data from a destination block of a data storage device, wherein the destination block is of the second block size;
providing, by the drive controller to the memory controller, a signal based on whether the first data differs from the second data, wherein at least one bit of the signal indicates whether the memory controller is to perform a Write-Write operation or an Exclusive Or (XOR)-on-the-fly operation; and
performing, by the memory controller, the Write-Write operation or the XOR-on-the-fly operation based on the signal provided by the drive controller.

2. The method of claim 1, wherein performing the Write-Write operation comprises:
writing, by the memory controller, the second data from the destination block of the data storage device to the first buffer, wherein the second data is written according to address information of the second data; and
writing, by the memory controller, zeros to a second buffer of the second block size, wherein the zeros are written to the second buffer at one or more locations corresponding to locations of the second data in the first buffer.

3. The method of claim 1, wherein performing the XOR-on-the-fly operation comprises:
reading, by the memory controller, the first data from the first buffer;
xoring, by the memory controller, the first data from the first buffer with the second data from the destination block of the data storage device to generate a XOR product; and writing, by the memory controller, the XOR product to a second buffer of the second block size, wherein the XOR product is written to the second buffer at one or more locations corresponding to locations of the first data in the first buffer.

4. The method of claim 1, further comprising:
writing, by the storage controller, data from the first buffer to the destination block of the data storage device, wherein the data from the first buffer includes both the first data and the second data;
reading, by the storage controller, P parity from a P parity drive of the second block size;
reading, by the storage controller, data from a second buffer;
xoring, by the storage controller, the data from the second buffer with the P parity from the P parity drive to generate additional P parity;
writing, by the storage controller, the additional P parity to a third buffer of the second block size; and
writing, by the storage controller, data from the third buffer to the P parity drive.

5. The method of claim 4, wherein the data storage device and the P parity drive are configured as Redundant Array of Independent Disks-5 (RAID-5).

6. The method of claim 1, further comprising:
writing, by the storage controller, data from the first buffer to the destination block of the data storage device, wherein the first buffer includes both the first data and the second data;
reading, by the storage controller, P parity from a P parity drive of the second block size;
reading, by the storage controller, data from a second buffer;
performing finite field multiplication, by the storage controller, for the data from the second buffer to generate finite field multiplication data;
xoring, by the storage controller, the finite field multiplication data with the P parity from the P parity drive to generate additional P parity;
writing, by the storage controller, the additional P parity to a third buffer of the second block size;
writing, by the storage controller, data from the third buffer to the P parity drive;
reading, by the storage controller, Q parity from a Q parity drive of the second block size;
reading, by the storage controller, the data from the second buffer;
performing finite field multiplication, by the storage controller, for the data from the second buffer to generate additional finite field multiplication data;
xoring, by the storage controller, the finite field multiplication data with the Q parity from the Q parity drive to generate additional Q parity;
writing, by the storage controller, the additional Q parity to a fourth buffer of the second block size; and
writing, by the storage controller, data from the fourth buffer to the Q parity drive.

7. The method of claim 6, wherein the data storage device, the P parity drive, and the Q parity drive are configured as Redundant Array of Independent Disks-6 (RAID-6).

8. The method of claim 1, wherein the first block size is about 512 bytes and the second block size is about 4 kilobytes.

9. The method of claim 1, wherein the first block size is less than the second block size.

10. An apparatus, comprising:
a memory; and one or more processors configured to:
receive first data of a first block size from a host executing an operating system configured to access blocks of the first block size;
write the first data to a first buffer of a second block size;
read second data from a destination block of a data storage device, wherein the destination block is of the second block size;
provide a signal based on whether the first data differs from the second data, wherein at least one bit of the signal indicates whether a Write-Write operation or an Exclusive Or (XOR)-on-the-fly operation is to be performed; and
in response to the at least one bit of the signal indicating that the Write-Write operation is to be performed:
write the second data from the destination block of the data storage device to the first buffer, wherein the second data is written according to address information of the second data; and
write zeros to a second buffer of the second block size, wherein the zeros are written to the second buffer at one or more locations corresponding to locations of the second data in the first buffer.

11. The apparatus of claim 10, wherein the one or more processors are further configured, in response to the at least one bit of the signal indicating that the XOR-on-the-fly operation is to be performed, to:
read the first data from the first buffer;
XOR the first data from first buffer with the second data from the destination block of the data storage device to generate a XOR product; and
write the XOR product to the second buffer of the second block size, wherein the XOR product is written to the second buffer at one or more locations corresponding to locations of the first data in the first buffer.

12. The apparatus of claim 10, wherein the one or more processors are further configured to:
write data from the first buffer to the destination block of the data storage device, wherein the first buffer includes both the first data and the second data written to the first buffer;
read P parity from a P parity drive of the second block size;
read second buffer data from the second buffer;
XOR the second buffer data with the P parity from the P parity drive to generate additional P parity;
write the additional P parity to a third buffer of the second block size; and
write data from the third buffer to the P parity drive.

13. The apparatus of claim 10, wherein the one or more processors are further configured to:
write data from the first buffer to the destination block of the data storage device, wherein the first buffer includes both the first data and the second data written to the first buffer;
read P parity from a P parity drive of the second block size;
read data from the second buffer;
perform finite field multiplication for the data from the second buffer to generate finite field multiplication data;
XOR the finite field multiplication data with the P parity from the P parity drive to generate additional P parity;
write the additional P parity to a third buffer of the second block size;
write data from the third buffer to the P parity drive;
read Q parity from a Q parity drive of the second block size;
read the data from the second buffer;
perform finite field multiplication for the data from the second buffer to generate additional finite field multiplication data;
XOR the finite field multiplication data with the Q parity from the Q parity drive to generate additional Q parity;
write the additional Q parity to a fourth buffer of the second block size; and
write data from the fourth buffer to the Q parity drive.

14. The apparatus of claim 10, wherein the first block size is about 512 bytes and the second block size is about 4 kilobytes.

15. The apparatus of claim 10, wherein the first block size is less than the second block size.

16. A storage controller, comprising:
a drive controller;
a memory controller;
a memory; and
one or more processors configured to:
receive first data of a first block size from a host;
write the first data to a first buffer of a second block size;
read second data from a destination block of a data storage device, wherein the destination block is of the second block size;
generate a signal based on whether the first data differs from the second data, wherein at least one bit of the signal indicates whether the memory controller is to perform a Write-Write operation or an Exclusive Or (XOR)-on-the-fly operation; and
in response to the at least one bit of the signal indicating to the memory controller to perform the Write-Write operation:
write the second data from the destination block of the second block size of the data storage device to the first buffer of the second block size, wherein the second data is written according to address information of the second data; and
write zeros to a second buffer of the second block size, wherein the zeros are written to the second buffer at one or more locations corresponding to locations of the second data in the first buffer.

* * * * *